(12) United States Patent
Fetzmann et al.

(10) Patent No.: US 7,933,714 B2
(45) Date of Patent: Apr. 26, 2011

(54) DEVICE FOR ASSISTING GROUND NAVIGATION OF AN AIRCRAFT ON AN AIRPORT

(75) Inventors: Fabien Fetzmann, Cugnaux (FR); Pierre Coldefy, Toulouse (FR); Thierry Malaval, Toulouse (FR); Stéphane Collins, Toulouse (FR)

(73) Assignee: Airbus France, Toulouse (FR)

( * ) Notice: Subject to any disclaimer, the term of this patent is extended or adjusted under 35 U.S.C. 154(b) by 676 days.

(21) Appl. No.: 11/995,024

(22) PCT Filed: Jul. 13, 2006

(86) PCT No.: PCT/FR2006/001712
§ 371 (c)(1),
(2), (4) Date: Jan. 8, 2008

(87) PCT Pub. No.: WO2007/010120
PCT Pub. Date: Jan. 25, 2007

(65) Prior Publication Data
US 2010/0121568 A1  May 13, 2010

(30) Foreign Application Priority Data

Jul. 22, 2005 (FR) .................................... 05 07801

(51) Int. Cl.
*G01S 19/21* (2010.01)
*G01C 21/00* (2006.01)
*G06F 19/00* (2006.01)

(52) U.S. Cl. .......... 701/208; 701/120; 701/10; 342/158; 340/521

(58) Field of Classification Search .................. 701/208, 701/120, 122, 3, 10; 342/158; 340/521, 340/927, 506, 961
See application file for complete search history.

(56) References Cited

U.S. PATENT DOCUMENTS

| 5,801,659 | A | * | 9/1998 | Helfrick | 342/357.4 |
| 5,890,079 | A | * | 3/1999 | Levine | 701/14 |
| 6,163,309 | A | * | 12/2000 | Weinert | 345/7 |
| 6,314,370 | B1 | * | 11/2001 | Curtright | 701/213 |
| 2004/0006412 | A1 | * | 1/2004 | Doose et al. | 701/10 |
| 2005/0090969 | A1 | * | 4/2005 | Siok et al. | 701/120 |

OTHER PUBLICATIONS

D. Jones, et al., "Airport surface movement technologies-Atlanta demonstration overview," Digital Avionics Systems Conference, 1998, Proceedings., 17th DASC. The AIAA/IEEE/SAE, Oct. 31-Nov. 7, 1998, vol. 2, IEEE, Meeting Date: Oct. 31, 1998-Nov. 7, 1998, pp. F21-1-F21-10.

D. Jones, et al., "Flight Demonstration of Integrated Airport Surface Automoation Concepts," Digital Avionics Systems Conference, 1995, 14th DASC, Nov. 5-9, 1995, IEEE, Nov. 5, 1999, pp. 77-82.

E. Theunissen, et al., "Design and Evaluation of Taxi Navigation Displays," Digital Avionics Systems Conference Proceedings., 21st DASC, Oct. 27-31, 2002, IEEE, vol. 1 of 2, Conf. 21, Oct. 27, 2002, pp. 549-561.

(Continued)

*Primary Examiner* — Tan Q Nguyen
(74) *Attorney, Agent, or Firm* — Dickinson Wright PLLC

(57) ABSTRACT

A device includes a current position unit for determining a current position of a aircraft, a mapping database, a navigation system, a current heading unit for determining the current heading of the aircraft, and a display system for displaying on a viewing screen, at least a partial map of the airport and, thereon, an aircraft symbol which is positioned at the current position and which is oriented in accordance with the current heading.

7 Claims, 1 Drawing Sheet

OTHER PUBLICATIONS

D. Jones, et al., "Runway Incursion Prevention System Simulation Evaluation," Digital Avionics Systems Conference Proceedings, Oct. 27-31, 2002, 21st DASC, IEEE vol. 1 of 2, Oct. 27, 2002, pp. 11B4-1-11B4-12.

* cited by examiner

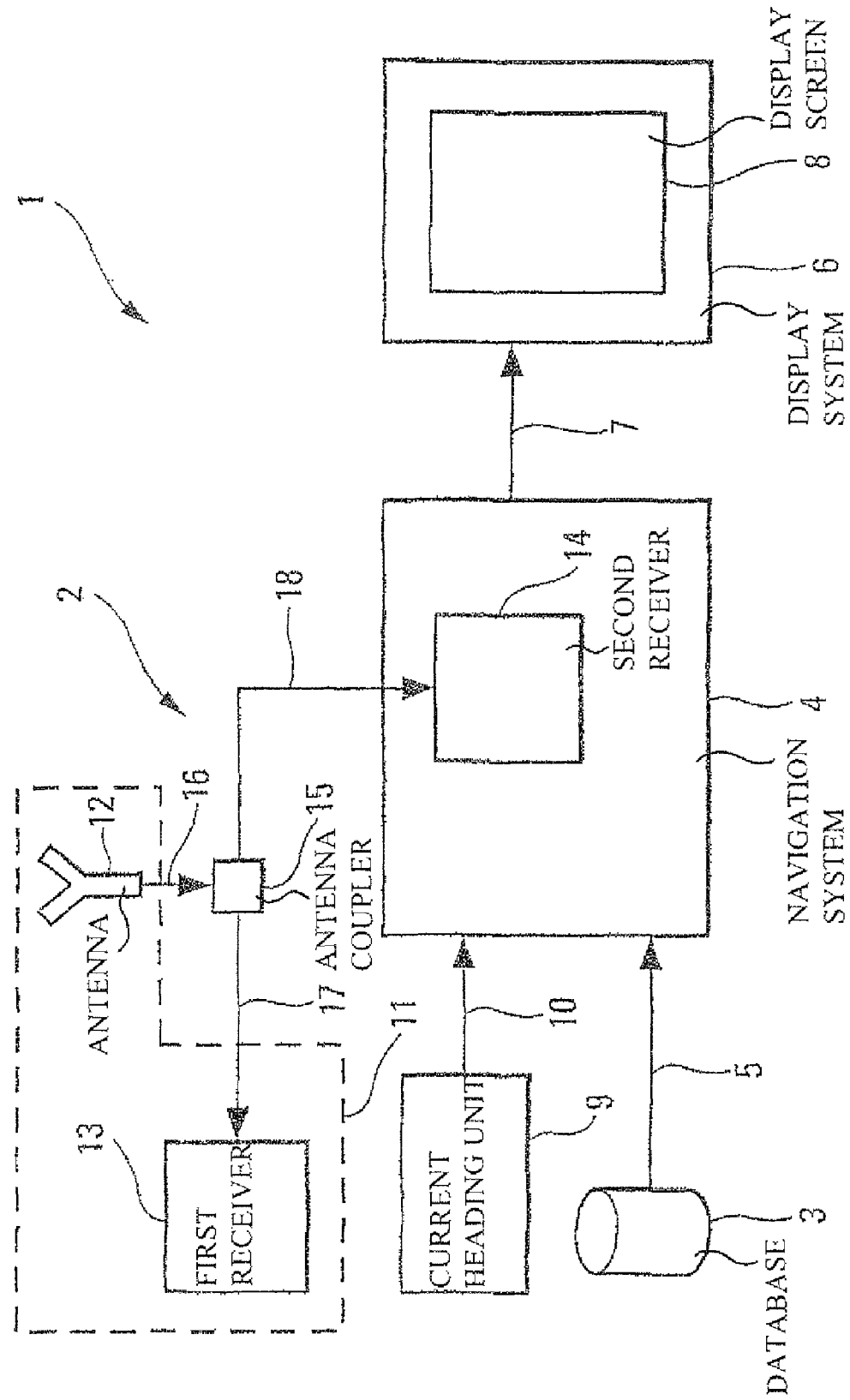

DEVICE FOR ASSISTING GROUND NAVIGATION OF AN AIRCRAFT ON AN AIRPORT

TECHNICAL FIELD OF THE INVENTION

The current invention relates to a device for assisting ground navigation of an aircraft on an airport.

BACKGROUND OF THE INVENTION

In the context of an airport navigation function (which makes it possible to display on a screen in the cockpit of an aircraft a map of the airport upon which is indicated, in particular, the current position of the aircraft), it is necessary to know the exact position of the aircraft when it is on the ground. The precision and the refresh rate of this position are determinant parameters for ensuring safety and the credibility of the displayed information, with respect to external references that can be seen by the pilot.

In order to determine its position in flight, the aircraft generally comprises positioning equipment which is associated with a satellite positioning system of the GPS or GALILEO or similar type, Such positioning equipment generally comprises an antenna which is mounted on the top of the aircraft, as well as a receiver which is linked with said antenna and which receives and processes the signals detected by the latter.

In the case of a GPS system, for example, the on-board positioning equipment which is intended for in-flight navigation generally delivers a position every second, which is not sufficient for creating an impression of movement of the aircraft on the display. Moreover, the current in-flight performance standards, with which this positioning equipment complies, do not cover the increased precision requirement on the ground (generally less than 10 meters), nor the phenomena associated with the environment encountered on the ground (presence of buildings and multiple reflections in particular).

This positioning equipment which is provided on the aircraft and which is perfectly suited to in-flight navigation is not therefore satisfactory for use in the context of airport navigation of the aforesaid type.

Another big disadvantage of a usual airport navigation function relates in particular to the display which is presented to the pilot. This display generally concerns an aircraft symbol which is presented at an estimated or measured position of the aircraft on an airport map, without however indication the orientation of said aircraft.

SUMMARY OF THE INVENTION

The purpose of the present invention is to overcome these disadvantages. It relates to a device for assisting ground navigation of an aircraft on an airport which is particularly effective and accurate.

For this purpose, according to the invention, said device comprising:
first means for determining the current position of said aircraft located on the ground;
a database comprising cartographic data relating to the airport;
a navigation system which receives at least said current position and said cartographic data, and which brings these data into conformity; and
a display system which receives information from said navigation system and which presents on at least one display screen a map, at least partial, of the airport and, upon the latter, an aircraft symbol which is positioned at said current position,
is noteworthy in that it furthermore comprises second means for determining the current heading of the aircraft and in that said navigate system receives said current heading and transmits it to said display system, and in that said display system is produced in such a way as to orientate said aircraft symbol on said partial map according to said current heading.

Thus, due to the invention, the pilot is presented with not only the current position of the aircraft on the displayed airport map but also its orientation. This allows the pilot to be given a very faithful representation of the real situation of the aircraft on the airport.

In a preferred embodiment, said first means comprise:
usual pre-existing positioning equipment, which is associated with a satellite positioning system, for example of the GPS type, and which comprises at least one antenna mounted on the aircraft, as well as a first receiver which is linked with said antenna;
a second receiver (additional and not initially provided) which is also linked with said antenna and which is able to determine the current position of the aircraft from signals received by the intermediary of said antenna; and
an antenna coupler (not initially provided, which is added):
which is provided with an input connected to said antenna and with two outputs connected to said first and second receivers respectively; and
which is produced in such a way as to double the signal received from the antenna and to transmit one of the signals obtained by this doubling to said first receiver and the other signal to said second receiver.

Thus, due to the invention, said (second) receiver which is intended for determining the current position of the aircraft, uses the positioning equipment existing on the aircraft, which is already provided with an antenna, which avoids having to add a new antenna on said aircraft, such an addition being generally difficult to achieve and, above all, very costly.

Moreover, due to the use of said antenna coupler, it is possible to provide a second receiver which is of much better performance than is said first receiver which is, in the usual manner, provided on the aircraft for in-flight navigation (such in-flight navigation not necessitating a particularly high precision and refresh rate). It is possible to obtain, due to these features, a current position of the aircraft which is particularly well-suited for a display relating to airport navigation.

In a preferred embodiment, said second receiver:
is integrated in said navigation system; and/or
has metric precision and a refresh rate which is greater than or equal to 20 Hz. It will be noted that the performance of such a receiver makes it possible to dispense with the use of an inertial source, in order to improve the refresh rate of the calculated position; and/or
can be parameterized. Thus, it is possible to configure said (second) receiver, preferably of known GPS COTS ("Commercial Off The Shelf") type, in order to take advantage of the available improvements of the satellite positioning system.

Moreover, in a particular embodiment, said second means comprise an inertial system of the aircraft.

BRIEF DESCRIPTION OF THE DRAWINGS

The single FIGURE of the appended drawing will give a good understanding of how the invention may be embodied.

This single figure is the block diagram of a device for assisting ground navigation according to the invention.

DETAILED DESCRIPTION OF THE INVENTION

The device 1 according to the invention and shown diagrammatically in the figure is intended to assist a pilot during the ground navigation of an aircraft, for example a transport aircraft on an airport.

In order to do this, this device 1 is of the type comprising:
- means 2, described below, for determining the current position of said aircraft (not shown) which is therefore located on the ground on the airport;
- a database 3 of the usual type, which comprises cartographic data relating at least to said airport;
- a navigation system 4 which is connected by the intermediary of link 5 to said database 3, which receives at least said current position from said means 2 and said cartographic data from said database 3, and which brings these data into conformity, that is to say which makes them able to be displayed simultaneously on a same device; and
- a display system 6 which is connected by a link 7 to said navigation system 4, which receives information (in particular the results of the aforesaid bringing into conformity) from said navigation system 4, and which presents, on at least one usual display screen installed in the cockpit of the aircraft, an airport map which shows, at least partially, said airport and, on this airport map, an aircraft symbol which is positioned at said current position with respect to real features of the airport displayed on said airport map.

According to the invention, said device 1 furthermore comprises means 9 for determining, in the usual manner, the current heading of the aircraft. These means 9, which preferably comprise an inertial system of the aircraft and in particular a unit or system of the ADIRU ("Air Data Inertial Reference Unit") type, transmit said current heading by the intermediary of a link 10 to said navigation system 4 which provides this information to said display system 6 which uses it at the display. More precisely, said display system 6 is produced in such a way as to orient said aircraft symbol on said airport map (not shown in the figure), according to the said received current heading.

Thus, the display system 6 presents the pilot not only with the current position of the aircraft on the displayed airport map, but also its orientation. This makes it possible for the pilot to have a very faithful representation of the real situation of the aircraft on the airport.

Moreover, in order to determine the current position of the aircraft, the device 1 according to the invention uses usual positioning equipment 11 which already exists on the aircraft and which is usually intended for in-flight navigation in particular. Such a usual positioning system 11 comprises at least one antenna 12 which is generally mounted on the top of the aircraft, and a receiver 13 which is connected to this antenna 12. This positioning equipment 11 cooperates with a usual satellite positioning system, for example of the GPS ("Global Positioning System") type or similar. In general, said positioning equipment 11 is of the known GPSSU ("Global Positioning System Sensor Unit") type. In particular, it provides GPS data on 3D position, speed, direction, time as well as information on the precision and the integrity of this data. Such positioning equipment 11 is optimized for in-flight navigation (and not for ground navigation). For this purpose, the antenna 12 is mounted on the top in such a way as to see the satellites low on the horizon in order to retain good visibility whilst turning. However, once on the ground, such an antenna 12 is particularly sensitive to a usual phenomenon known as "multipath", which can be encountered close to buildings.

Consequently, such positioning equipment 11 is not designed to be used, as it is, in the context of airport navigation.

However, in order to avoid having to install an additional positioning system on the aircraft, which would be expensive and difficult to implement, particularly with regard to the antenna, said means 2 comprise, according to the invention, said preexisting positioning equipment 11. Moreover, according to the invention, said means 2 also comprise:
- an additional receiver 14 which is linked to said antenna 12 of said equipment 11, as described below, and which is intended for determining the current position of the aircraft (which is provided to the navigation system 4), from signals received by the intermediary of said antenna 12; and
- an antenna coupler 15:
    - which is provided with an input which is connected by the intermediary of a link 16 to said antenna 12 and with two outputs connected which are connected by the intermediary of links 17 and 18 to said receivers 13 and 14 respectively; and
    - which is produced in such a way as to double the signal received from the antenna 12 and to transmit one of the signals obtained by this doubling to said receiver 13 which can thus continue to function normally, in particular for in-flight navigation, and the other signal to said receiver 14 which is used for the implementation of the present invention.

Said antenna coupler 15 is chosen in such a way as to guarantee that the isolation between the outputs does not allow possible interference from one output to propagate across. It is also such that a possible attenuation of the power of the signal is acceptable for both receivers 13 and 14. The input and the outputs of the coupler 15 are connected by matched connectors to said links 16, 17 and 18.

Thus, due to the use of said antenna coupler 15, it is possible to provide an additional receiver 14 which has much better performance than said receiver 13 which is provided, in the usual manner, on the aircraft for in-flight navigation (and which because of this does not necessitate particularly high precision and refresh rate). There is thus obtained, by means of the invention, a current position of the aircraft which is particularly well suited for a display relating to airport navigation.

In a preferred embodiment, said receiver 14 is integrated in the navigation system 4 and corresponds to a new generation airworthy GPS receiver, a COTS ("Commercial Off The Shelf") product, which achieves performance better than an aeronautical GPS receiver. Moreover, such a COTS GPS receiver comprises usual specific algorithms which make it possible to increase the data refresh rate, to reduce the multipath phenomenon and to reduce the acquisition and reacquisition times.

In particular, such a COTS GPS receiver (receiver 14) can have metric precision (95%) and a refresh rate which is greater than or equal to 20 Hz, whereas a usual aeronautical GPSSU receiver (receiver 13) generally has a precision (95%) of the order of 15 to 30 meters and a refresh rate of from 1 to 5 Hz. It will be noted that the performance of such a receiver 14 also makes it possible to dispense with the use of an inertial source in order to improve the refresh rate of the calculated current position.

Moreover, in a particular embodiment, said receiver 14 can be parameterized. Thus, it is possible to configure said receiver 14 in order to take advantage of the available improvements of the satellite positioning system: GBAS, SEAS, GALILEO, etc.

In the case of the present invention, said device 1 therefore uses only the antenna 12 of the positioning system 11, but not the receiver 13. Furthermore, as mentioned above, this equipment 11 which moreover continues to be used for carrying out its usual functions, in particular with regard to in-flight navigation, has been modified by integrating the coupler 15 between the antenna 12 and the receiver 13.

The invention claimed is:

1. A device for assisting ground navigation of an aircraft on an airport, said device comprising:
    a current position unit for determining a current position of said aircraft located on ground, said current position unit comprising positioning equipment associated with a satellite positioning system;
    a current heading unit for determining a current heading of the aircraft;
    a database comprising cartographic data relating to the airport;
    a navigation system which receives and brings together said current position, said heading and said cartographic data for simultaneous display; and
    a display system which receives information from said navigation system and which presents on at least one display screen at least a partial map of the airport and an aircraft symbol which is positioned at said current position and oriented according to said current heading,
    wherein said current position unit comprises:
    said positioning equipment, which comprises at least one antenna which is mounted on the aircraft, and a first receiver for in-flight navigation which is linked with said antenna;
    a second receiver for ground navigation and having greater performance than said first receiver, and which is linked with said at least one antenna and configured to determine the current position of the aircraft from signals received and by an antenna coupler of said antenna;
    the antenna coupler:
    which is provided with an input connected to said antenna and with two outputs connected to said first and second receivers respectively; and
    which is configured to double the signal received from the antenna and to transmit one of the signals obtained by the doubling to said first receiver and the other signal to said second receiver.

2. The device as claimed in claim 1, wherein said second receiver is integrated in said navigation system.

3. The device as claimed in claim 1, wherein said second receiver has metric precision and a refresh rate which is greater than or equal to 20 Hz.

4. The device as claimed in claim 1, wherein said second receiver can be parameterized.

5. The device as claimed in claim 1, wherein said current heading unit comprises an inertial system of the aircraft.

6. An aircraft, comprising a device as claimed in claim 1.

7. The device as claimed in claim 1, wherein said second receiver is a COTS GPS receiver.

* * * * *